(12) United States Patent
Hesse

(10) Patent No.: US 11,127,281 B1
(45) Date of Patent: Sep. 21, 2021

(54) SECURITY METHOD AND APPLICATION SOFTWARE

(71) Applicant: Roald Mathias Hesse, Harztor (DE)

(72) Inventor: Roald Mathias Hesse, Harztor (DE)

( * ) Notice: Subject to any disclaimer, the term of this patent is extended or adjusted under 35 U.S.C. 154(b) by 1 day.

(21) Appl. No.: 16/824,084

(22) Filed: Mar. 19, 2020

(51) Int. Cl.
| | | |
|---|---|---|
| *G08B 21/02* | (2006.01) | |
| *G08B 25/01* | (2006.01) | |
| *H04W 4/024* | (2018.01) | |
| *G08B 25/10* | (2006.01) | |
| *G08B 21/18* | (2006.01) | |
| *H04W 4/029* | (2018.01) | |

(52) U.S. Cl.
CPC ......... *G08B 25/016* (2013.01); *G08B 21/182* (2013.01); *G08B 25/10* (2013.01); *H04W 4/024* (2018.02); *H04W 4/029* (2018.02)

(58) Field of Classification Search
CPC .. G08B 25/016; G08B 25/10; G08B 21/0202; G08B 21/0236; G08B 21/0252; G08B 21/0261; G08B 21/0269; G08B 21/0272; G08B 21/0283; G08B 21/0294; G08B 21/182; H04W 4/024; H04W 4/029
See application file for complete search history.

(56) References Cited

U.S. PATENT DOCUMENTS

| | | | | |
|---|---|---|---|---|
| 8,115,625 | B2 * | 2/2012 | Yoshioka | H04W 68/00 340/539.15 |
| 9,413,707 | B2 * | 8/2016 | Roman | H04W 4/14 |
| 10,013,871 | B1 * | 7/2018 | Braun | G08B 25/10 |
| 10,573,184 | B1 | 2/2020 | Pandit et al. | |
| 2005/0037729 | A1 * | 2/2005 | Dupont | H04W 4/02 455/404.2 |
| 2005/0075116 | A1 * | 4/2005 | Laird | A61B 5/04 455/456.3 |

(Continued)

FOREIGN PATENT DOCUMENTS

EP 2557397 B1 2/2014

OTHER PUBLICATIONS

International Search Report and Written Opinion of the International Searching Authority dated May 17, 2021 in the corresponding International Patent Application No. PCT/EP2021/054594/.

*Primary Examiner* — Andrew W Bee
(74) *Attorney, Agent, or Firm* — Saliwanchik, Lloyd & Eisenschenk

(57) ABSTRACT

Security method for route tracking and route monitoring by means of an electronic device and at least one external receiving device linked to the electronic device, the electronic device being configured to carry out a position determination using one or more location methods, which comprises the following steps: defining an individual reference route by entering the starting point and destination point and adapting the route guidance; defining a security perimeter by entering a maximum distance value; continuously determining the position while following a reference route; continuously calculating the distance of the current position from the reference route; comparing the current distance of the current position from the reference route with the defined maximum distance of the security perimeter; transmitting a signal by means of wireless data transmission to the at least one linked receiving device if the current position is outside the security perimeter; outputting a signal of the linked receiving device.

20 Claims, 3 Drawing Sheets

(56) References Cited

U.S. PATENT DOCUMENTS

| | | | | |
|---|---|---|---|---|
| 2012/0094696 | A1* | 4/2012 | Ahn | H04N 21/64322 |
| | | | | 455/456.2 |
| 2012/0105225 | A1* | 5/2012 | Valtonen | A61B 5/1112 |
| | | | | 340/539.13 |
| 2013/0109427 | A1* | 5/2013 | Matus | G08B 21/025 |
| | | | | 455/521 |
| 2013/0324166 | A1* | 12/2013 | Mian | H04W 4/021 |
| | | | | 455/457 |
| 2015/0163626 | A1* | 6/2015 | Zimmer | H04W 4/02 |
| | | | | 455/404.2 |
| 2016/0027292 | A1* | 1/2016 | Kerning | H04W 4/14 |
| | | | | 455/404.2 |
| 2016/0358432 | A1* | 12/2016 | Branscomb | G08B 13/1965 |
| 2018/0001870 | A1 | 1/2018 | Herman et al. | |
| 2018/0003516 | A1 | 1/2018 | Khasis | |
| 2020/0382908 | A1* | 12/2020 | Behzadi | H04W 4/029 |

\* cited by examiner

SECURITY METHOD AND APPLICATION SOFTWARE

FIELD OF THE INVENTION

The invention relates to a security method for route tracking and route monitoring by means of an electronic transmitting device being configured to carry out continuous position determination, and to an application program configured to control the electronic transmitting device to carry out a route monitoring procedure.

BACKGROUND OF THE INVENTION

Various embodiments of navigation devices or systems are known. They essentially comprise a position-determining device which determines the position in space in a manner known per se with the aid of GPS or Galileo signals emitted by satellites. Starting from this position, a route guidance device can calculate a route to the destination point entered by the user and corresponding directional information can be provided optically and/or acoustically. Such navigation devices are either designed to be portable, for example so that they can be carried by the user outdoors, or they are installed in a passenger vehicle or in a vehicle for transporting goods in order to reach a destination.

The route can be calculated depending on user-specified criteria such as, inter alia, indication of intermediate points or exclusion of specific routes. For the provision of route guidance information, it is known to use an artificially represented road map, possibly with an overlay of aerial photographs or satellite photos, reproduced on a display or screen of the navigation device. The route can be highlighted in colour in this representation It is also known that computer-implemented application programs are configured to establish route guidance and route planning independently of a genuine navigation device. A route can be defined by a user on a data processing device, for example a PC or another mobile terminal, such as a smartphone, by specifying the starting point and the destination point. This defined route can also be called up via a plurality of linked devices; for example, the route is determined via the navigation program on the PC and transmitted to a terminal such as a smartphone or navigation device, so that the defined route can serve as the basis for route guidance.

There are some situations where people need to tell other selected people if and when a certain destination point has been reached. From a security point of view, in particular, it can be advantageous for other people to know about the route and the arrival. For example, it is important for parents of school children to know whether they have safely completed the walk between home and school. Other situations in which groups of people are in particular need of protection, such as women alone on their way home at night, are also always associated both with an increased need for security and with an increased need for monitoring by a contact person. This applies not only to people who travel on foot or by public transport, but also to long-distance travellers, for example, solo travellers who are travelling in a passenger vehicle such as a car or train.

In this context, it is known for an individual to be able to share their current location with selected persons by active actuation of the locate function, so that said persons are informed of the current position. This is possible, for example, via mobile communication terminals, which use an application program to send the current location via a communication network to selected receiving devices, of the contact person, where it can be displayed on a visually generated map.

BRIEF SUMMARY OF THE INVENTION

An object of this invention is to provide a method which makes it possible to link travellers and contact persons and to ensure route monitoring from a security perspective.

Embodiments of the invention achieve this object by the features of the embodiments in the embodiment section. Advantageous configurations can be found in the sub-embodiments and the description.

One basic idea of an embodiment of the invention consists in that a security procedure, in particular a route monitoring procedure, can be carried out by means of a computer-implemented application program. Route monitoring is implemented by means of an electronic transmitting device which is suitable for position determination and can be connectable to an external receiving device through control by the application program.

In the context, in an embodiment of the invention, a user first defines an individual reference route by entering the starting point and destination point and adjusting the route guidance, and then a security perimeter is defined by entering a maximum distance value. The distance value should preferably be greater than or equal to 2 m from the actual location. The position of the user is determined continuously while a user is following the reference route. The distance of the current position from the reference route is calculated continuously and compared with the defined maximum distance of the security perimeter. A signal is outputted, preferably to at least one linked receiving device, by wireless data transmission, if the current position is outside the security perimeter. A corresponding signal is then rendered on the linked receiving device.

An embodiment of the invention has an advantage that helpers can be activated by the user, for example, from circles of family, friends or acquaintances. It is possible for these persons to be immediately informed in case of deviation from the predefined route of the user without, for example, needing to actively monitor the position data of the user. The previously defined security distance forms an alarm-free movement zone around the planned route, so that slight deviations from the route are permissible and do not lead to false alarms. For example, to map the entire area of a wide street, a narrow security distance of 50 m is entirely sufficient as a range of motion for people walking, whereby a distance of 1000 m gives the user greater freedom of movement. On the other hand, for a traveller in a car, 1000 m is a narrow corridor, which however also does not trigger an alarm when the route is left, for example to drive to a fuelling station. The movement zone can preferably be set in a customisable manner at a distance from the actual location of between 0 m and 10000 m, preferably between 2 m and 10000 m. A more accurate detection of the position, reaching almost pin-point precise location detection, is also conceivable and is covered by the disclosure. Only the current limitations of state-of-the-art position determination define the lower limit of a minimum distance.

The automated monitoring procedure also means that the user does not need to intervene to issue an alarm signal independently; especially in dangerous situations, the user may no longer be able to do this. With other user groups, such as children, there is already no expectation of or justification for independent emergency communication.

The data transmission from the transmitting device to the receiving device is advantageously carried out via a mobile communication network and is controlled by the application program, so that only previously defined and linked receiving devices can receive and send the signals.

In an advantageous embodiment, signal transmission to the linked receiving device is also preformed when the destination point is reached. The route monitoring is thereby not only successfully completed for the user, but the successful completion of the specified reference route is also signalled and reported to the contact persons.

In a further advantageous embodiment, a user actively starts the route monitoring procedure by input into the electronic transmitting device, or a contact person remotely starts the route monitoring by input into the linked receiving device. The input can be implemented, for example, via a start button on a user interface of the transmitting device. The user interface can be formed by a visual representation on a screen with tactile user input. In the event of a remote start, the application program ensures that the contact person transmits the start signal to the actual transmitting device, which also carries out the monitoring procedure. It can also be advantageous that further data, such as the reference route data, are also remotely transmitted to the transmitting device if, for example, the contact person creates a new route.

In a further advantageous embodiment, the route monitoring procedure is started automatically at a previously defined start time, so further active operation of the transmitting device or of the application program can be omitted with prior knowledge and determination of the start time. This also ensures that the user does not accidentally forget to start route monitoring. In this context, it is also advantageous to make a note of further reference routes, such as, for example, a return route for a specific start time.

It is further advantageous that a predetermined period of time is defined for the route to be covered, and that a signal is transmitted to the linked receiving device if the period of time is exceeded without the destination having been reached. The route monitoring and signalling thereby extends not only to the geographic, but also to the temporal aspect of the route. The contact persons thus find out whether the user has reached the destination within the allotted time. The time period is determined by a calculation of the application program for the defined route; in this context, it is possible for the application program to access its own route and map data, or access data from another map and traffic data service. After specifying the means of transportation, for example on foot, by bike, car or public transport, the route duration can thereby be determined. However, it can also be advantageous to define an alternative or additional route time, for example, to take time buffers or breaks into account.

It is further advantageous that a predetermined destination time is fixed and that a signal is transmitted to the linked receiving device if the destination has not been reached by this destination time. The contact persons thus find out whether the user has reached the destination on time or has already been delayed.

When the application program detects one of the described signal parameters, a signal transmission is initiated by means of a wireless data connection, in particular a mobile communication data connection, which is directed to at least one receiving device linked and enabled in the application program. The application program does not necessarily also need to be installed on the receiving device, but rather can be made available by accessing other connection channels on the receiving device, which are preferably output as an optical and/or acoustic and/or vibration signal.

It is further preferred that the signal output by the receiving device is in the form of a text message. This can either be implemented internally in the application, if the application program is installed both on the transmitting device and on the receiving device, or via another text communication platform. In particular, the message can take place via a so-called push notification.

It is particularly preferred that the signal output by the receiving device provides information about when and at what position the security perimeter has been left.

In a further preferred embodiment, the current position of the user or of the electrical transmitting device can be continuously transmitted to the linked receiving device. This additional option can preferably be set to active or inactive, by the user, for individual contact persons.

The electronic transmitting device is substantially a mobile communication terminal which is configured to display navigation data. Intelligent electronic devices such as smartphones or tablet computers are particularly suitable. Devices of this type are able to implement the application program and generally comprise the standardised connection technologies in order to act as an interface for signal transmission to the receiving device. The transmitting device advantageously comprises a display, particularly preferably a touch-sensitive display.

Alternatively, the transmitting device can also be a mobile navigation device or one permanently installed in a vehicle. Such navigation devices, both mobile and permanently installed devices, must also be able to implement the application program and provide connection interfaces.

One aspect of an embodiment of the invention relates to a computer-implemented application program which is configured to control and link the electronic transmitting device and the at least one receiving device and to carry out the described monitoring procedure. It is therefore configured so that the user can define one or more individual reference routes. This can be done by the application program and the transmitting device being configured to define a reference route directly. This can be done by entering the starting and destination points, as is customary in known navigation services, or by entering coordinates (longitude and latitude coordinates), for example, in the event that no roads are available. It is preferably also possible for routes to be defined externally and to be transmitted to the application program, which can store and call up the reference route in a local memory of the transmitting device. Furthermore, the application program is configured to define a security perimeter around the reference route and to continuously determine the position while following the reference route. This can take place via satellite positioning signals such as GPS or Galileo signals or, for example, also via cell site analysis in a mobile communication network. Furthermore, the application program is configured to continuously compare the current position with the parameters specified by the security perimeter and to send signals to a linked receiving device by means of wireless data transmission, such as mobile communication/mobile Internet signals.

In a preferred embodiment, the application program is configured to provide a user interface which enables a map representation of the route determination. This can be shown on a display of the transmitter and the relevant starting and destination points can be entered by the user by touch control by tapping a point on the map display.

It is furthermore advantageous that the application program also displays the security perimeter in addition to the defined route in the map display. This can be done, for example, by colour highlighting around the route representation, wherein the colour highlighting corresponds, on the scale of the displayed map section, to the defined security distance.

For this purpose, it is preferred that the application program provides the user with a simple input and setting of the security perimeter, preferably by means of a visual touch surface slider.

The application program can preferably also be implemented as a so-called plug-in or tool of another known navigation program, so that it merely adds the additional input and setting options for the security perimeter and the start/destination time or route duration in the user interface of the known navigation program.

BRIEF DESCRIPTION OF THE FIGURES

The invention will be explained below on the basis of the preferred embodiments with reference to the accompanying drawings, in which.

DETAILED DESCRIPTION OF THE INVENTION

Figure 1:
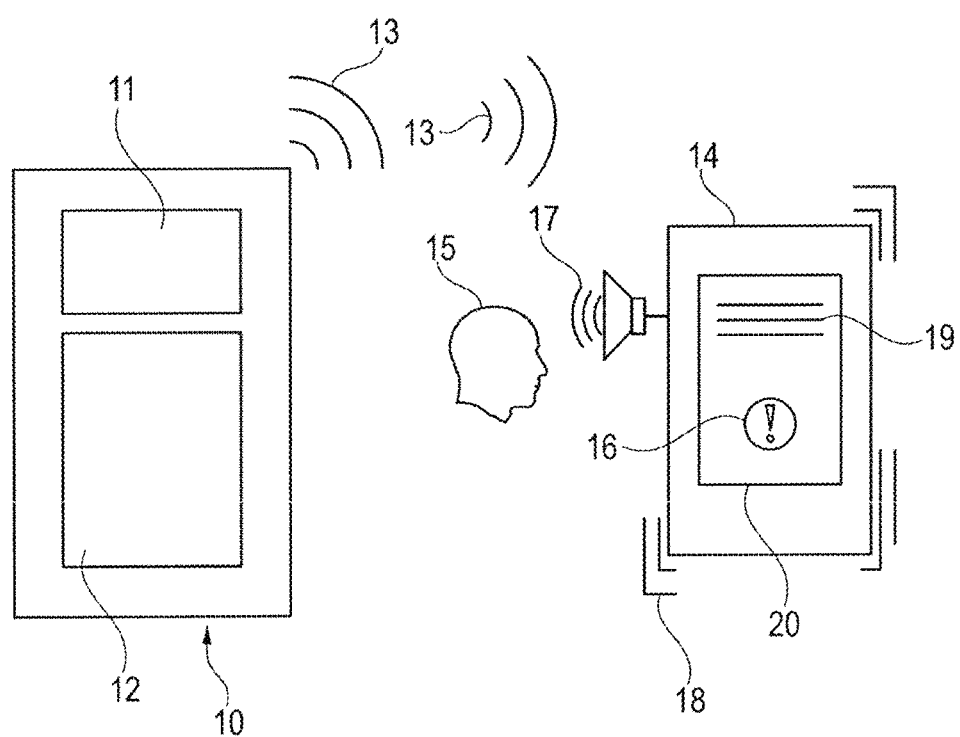
FIG. 1 schematically shows the basic components of route monitoring.

A position-determining device 11 of the transmitting device 10 is designed such that, starting from a defined starting point and the current position, it can determine a route to a destination point specified by the user and can provide corresponding optical and/or acoustic route information to the user (FIG. 1). This is done, for example, by displaying map information in two or three dimensions on a display 12 or a screen.

When route monitoring is active, the application program can send signals 13 according to defined criteria to the linked receiving device 14 of a contact person 15. The receiving device 14 then, in turn, provides a signal to the contact person. This can be achieved with optical 16, acoustic 17 or vibration 18 signals. In particular, the notification can be implemented in a text message 19 on a display 20 of the receiving device 14 with the content that the user has left the security perimeter or that the user has reached the destination. Further location-related information can also be transmitted, such as where and when the security perimeter was left.

Figure 2:
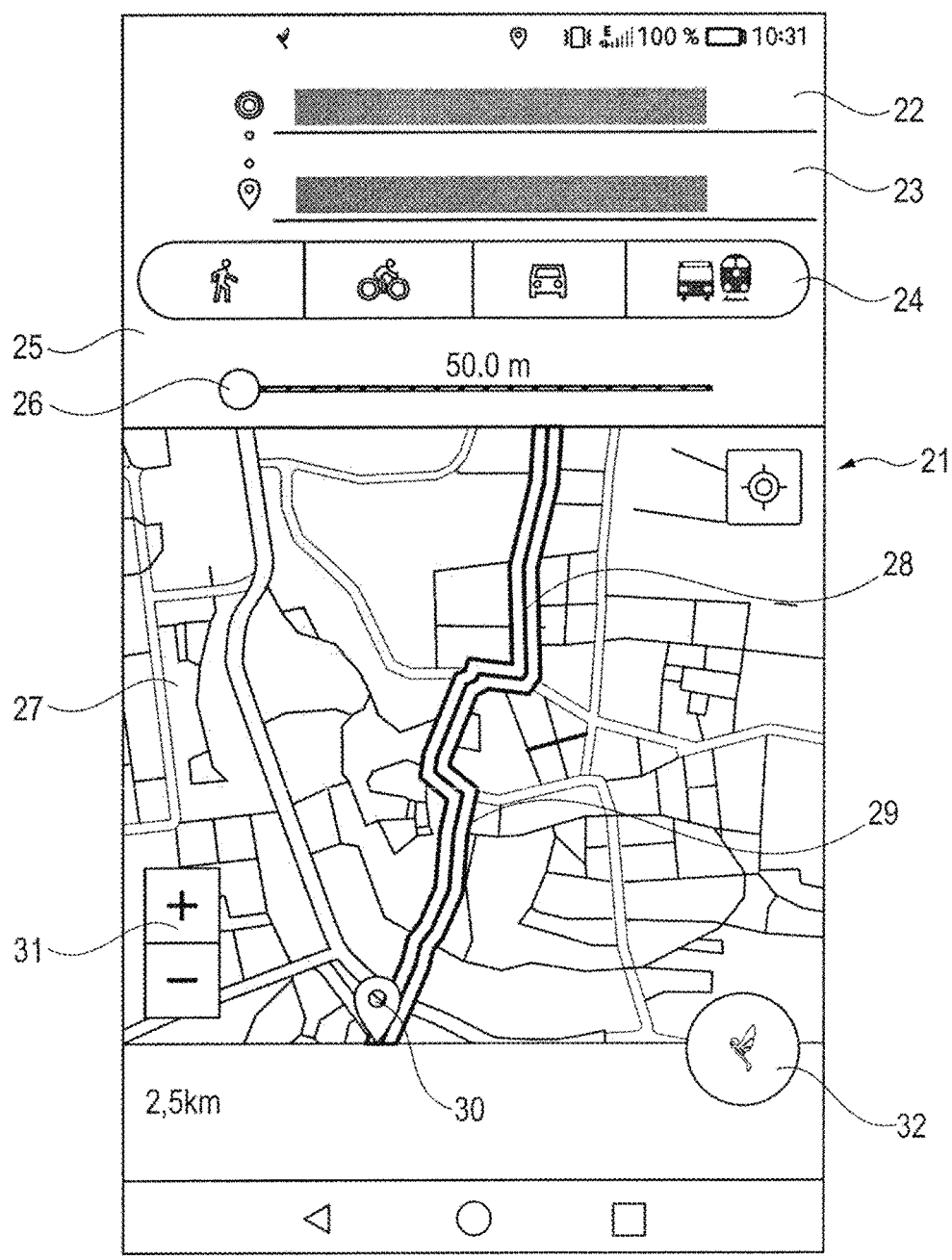
FIG. 2 shows a user interface of the application program with a representation of a reference route having a first security perimeter.
Figure 3:
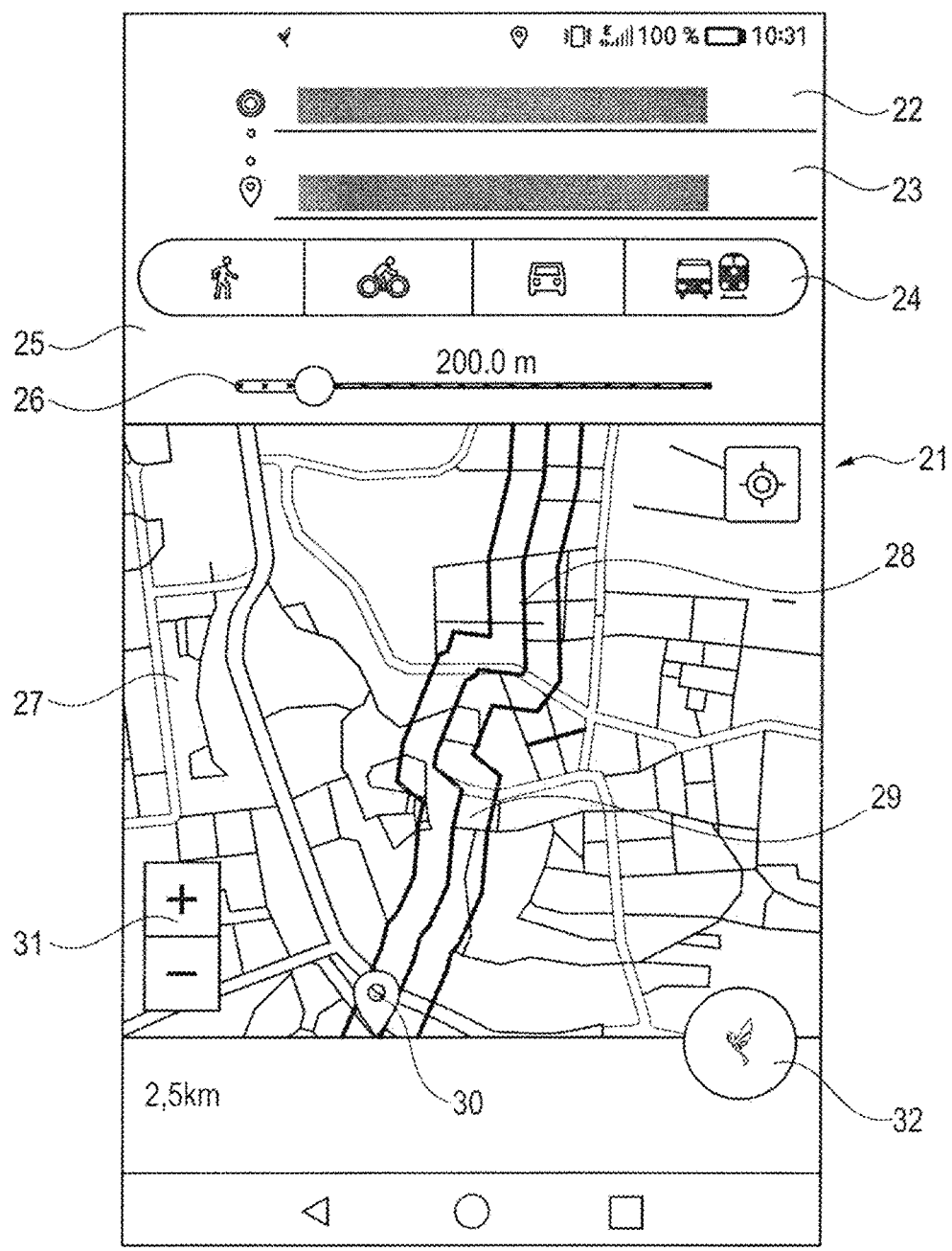
FIG. 3 shows a user interface of the application program with a representation of a reference route having a second security perimeter.

A corresponding representation with different defined security perimeters can be seen in FIGS. 2 and 3. A user interface 21 is shown in a manner customary for navigation services, which has input areas for starting point 22 and destination point 23 in the upper area. Furthermore, additional parameters can be set, such as the type of means of transport 24, which can be selected from on foot, by bicycle or by motor vehicle. A further selection relates to local and long-distance public transport, such as buses and trains, which includes timetable information for public transport.

In a further setting area 25, the application program offers the user the possibility of setting the security perimeter by means of a virtual slider 26. In the embodiment shown, a security perimeter of at least 2 m to at most 10000 m can be set using the slider. The map display 27 of the reference route 28 takes up most of the user interface 21. The calculated route guidance, which is determined from the input of the starting and destination points and optionally further customisations, such as intermediate destinations, is shown here by means of a highlighted line. In accordance with the setting of the security perimeter by means of the slider 26, the security perimeter is displayed as a colour-highlighted area 29 around the shown route 28. A narrow security perimeter 29 of 50 m is set in FIG. 2, and a wider security perimeter 29 of 200 m is set in FIG. 3 around the route 28. The determined position of the current location is also displayed using a graphical symbol 30. The user can set the scale of the displayed map section 27 by using buttons 31 assigned to a zoom function or using touch sequences (tap, drag, slide, etc.). It is also possible to provide additional input fields (not shown) through which start times, destination times and travel durations can be entered or adjusted.

A start button 32 can be provided, whereby the user actively starts route monitoring. Alternatively, route monitoring starts automatically at a specified start time.

EMBODIMENTS

Embodiment 1. Security method for route tracking and route monitoring by means of an electronic transmitting device being configured to carry out a position determination using one or more location methods, comprising
 defining an individual reference route by entering a starting point and a destination point and adapting the route guidance,
 defining a security perimeter by entering a maximum distance value,
 continuously determining the position while following a reference route,
 continuously calculating the distance of the current position from the reference route,
 comparing the current distance of the current position from the reference route with the defined maximum distance of the security perimeter,
 outputting a signal by means of wireless data transmission to be received by at least one receiving device when the current position is outside the security perimeter.

Embodiment 2. Security method according to embodiment 1, characterised in that a signal output to a receiving device is performed when the destination point is reached.

Embodiment 3. Security method according to claim 1 or 2, characterised in that a user actively starts the route monitoring procedure by input into the electronic device or input into a linked receiving device.

Embodiment 4. Security method according to any one of the preceding embodiments, characterised in that the route monitoring procedure begins automatically at a predefined start time.

Embodiment 5. Security method according to any one of the preceding embodiments, characterised in that a predetermined period of time is specified for the route to be covered and that a signal is output to a receiving device if the period of time is exceeded without the destination having been reached.

Embodiment 6. Security method according to any one of the preceding embodiments, characterised in that a predetermined destination time is fixed and that a signal output to the linked receiving device is performed if the destination has not been reached by this destination time.

Embodiment 7. Security method according to any one of the preceding embodiments, characterised in that the transmitting device is linked to at least one external receiving device, and rendering a signal on the linked receiving device Embodiment 8. Security method according to claim 7, characterized in that the signal rendered by the receiving device is an optical and/or acoustic and/or vibration signal.

Embodiment 9. Security method according to embodiments 7 or 8, characterised in that the signal rendered by the receiving device contains a text message.

Embodiment 10. Security method according to any one of embodiments 7 to 9, characterised in that the signal rendered by the receiving device provides information about the point in time and the position at which the security perimeter was left.

Embodiment 11. Security method according to any one of the preceding embodiments, characterised in that the current position of the electrical transmitting device is continuously output by the transmitting device at pre-defined or user defined time intervals.

Embodiment 12. Security method according to any one of the preceding embodiments, characterised in that the electronic transmitting device is a mobile communication terminal configured to display navigation data.

Embodiment 13. Security method according to any one of the preceding embodiments, characterised in that electronic transmitting device is any one of a mobile navigation device, a smartphone, a tablet computer and/or a smart watch.

Embodiment 14. Security method according to any one of the preceding claims, characterised in that the electronic transmitting device is installed in a vehicle.

Embodiment 15. Computer-implemented application program which is configured to control an electronic transmitting device to carry out the security method according to any one of the preceding embodiments.

Embodiment 16. Application program according to embodiment 15, characterised in that it is configured to provide a user interface which enables a map representation of the route determination on a display of the electronic transmitting device.

Embodiment 17. Application program according to embodiment 15 or 16, characterised in that it is configured to display the security perimeter on the map display.

Embodiment 18. Application program according to embodiment 17, characterised in that it is configured to set an input of the security perimeter by means of a visual slider of a touch screen of the electronic transmitting device.

Aspects of the invention, such as route tracking and route monitoring, may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and non-volatile media, transient and non-transient media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

The invention claimed is:

1. A method for route tracking and route monitoring, comprising:
   providing an electronic transmitting device, wherein the electronic transmitting device is configured to carry out a position determination using one or more location methods;
   defining an individual reference route by entering a starting point and a destination point and adapting a route guidance;
   defining a security perimeter by entering a maximum distance value;
   continuously determining a position while following the individual reference route;
   continuously calculating a distance of the position from the individual reference route;
   comparing the distance of the position from the individual reference route with the maximum distance value of the security perimeter;
   outputting a security signal via wireless data transmission to be received by at least one receiving device when the distance is greater than the maximum distance of the security perimeter;
   providing a user interface which enables a map representation of the individual reference route on a display of the electronic transmitting device;
   displaying the security perimeter on the display; and
   setting an input of the security perimeter via a visual slider of a touch screen of the electronic transmitting device.

2. The method according to claim 1, wherein a destination point reached signal is output to be received by the at least one receiving device when the destination point is reached.

3. The method according to claim 1, wherein a user actively starts a route monitoring procedure by input into the electronic transmitting device or input into the at least one receiving device, wherein the route monitoring procedure comprises the determining, calculating, and comparing steps.

4. The method according to claim 3, wherein the route monitoring procedure begins automatically at a predefined start time.

5. The method according to claim 1, wherein a predetermined period of time is specified for the individual reference route to be covered and a time exceeded signal is output to be received by the at least one receiving device if the predetermined period of time is exceeded without the destination point having been reached.

6. The method according to claim 1, wherein a predetermined destination time is fixed and a destination not reached signal is output to be received by the at least one receiving device if the destination point has not been reached by this predetermined destination time.

7. The method according to claim 1, further comprising:
   linking the transmitting device to the at least one receiving device, and
   rendering a signal on the at least one receiving device.

8. The method according to claim 7, wherein the signal rendered by the at least one receiving device comprises one or more of the following:
   an optical signal;
   an acoustic signal; and
   a vibration signal.

9. The method according to claim 7, wherein the signal rendered by the at least one receiving device contains a text message.

10. The method according to claim 7, wherein the signal rendered by the at least one receiving device provides information about a point in time and the position at which the distance was greater than the maximum distance of the security perimeter.

11. The method according to claim 1, wherein the position of the electronic transmitting device is continuously output by the electronic transmitting device at pre-defined or user defined time intervals.

12. The method according to claim 1, wherein the electronic transmitting device is a mobile communication terminal configured to display navigation data.

13. The method according to claim 1, wherein the electronic transmitting device is one or more of the following:
   a mobile navigation device;
   a smartphone;
   a tablet computer; and
   a smart watch.

14. The method according to claim 1, wherein the electronic transmitting device is installed in a vehicle.

15. A non-transitory computer readable medium comprising instructions which when executed by a computer carry out the method
   comprising:
   carrying out a position determination, for an electronic transmitting device, using one or more location methods;
   defining an individual reference route by entering a starting point and a destination point and adapting a route guidance;
   defining a security perimeter by entering a maximum distance value;
   continuously determining a position while following the individual reference route;
   continuously calculating a distance of the position from the individual reference route;
   comparing the distance of the position from the individual reference route with the maximum distance value of the security perimeter;
   outputting a security signal via wireless data transmission to be received by at least one receiving device when the distance is greater than the maximum distance of the security perimeter;
   providing a user interface which enables a map representation of the individual reference route on a display of the electronic transmitting device;
   displaying the security perimeter on the display; and
   setting an input of the security perimeter via a visual slider of a touch screen of the electronic transmitting device.

16. The non-transitory computer readable medium according to claim 15, wherein a destination point reached signal is output to be received by the at least one receiving device when the destination point is reached.

17. The non-transitory computer readable medium according to claim 15 wherein a user actively starts a route monitoring procedure by input into the electronic transmitting device or input into the at least one receiving device, wherein the route monitoring procedure comprises the determining, calculating, and comparing steps.

18. The non-transitory computer readable medium according to claim 17, wherein the route monitoring procedure begins automatically at a predefined start time.

19. The non-transitory computer readable medium according to claim 15, wherein a predetermined period of time is specified for the individual reference route to be covered and a time exceeded signal is output to be received by the at least one receiving device if the predetermined period of time is exceeded without the destination point having been reached.

20. The non-transitory computer readable medium according to claim 15, wherein a predetermined destination time is fixed and a destination not reached signal is output to be received by the at least one receiving device if the destination point has not been reached by this predetermined destination time.

\* \* \* \* \*